(12) United States Patent
Mittler

(10) Patent No.: US 9,273,629 B2
(45) Date of Patent: Mar. 1, 2016

(54) PISTON RING FOR TWO-STROKE ENGINES

(75) Inventor: Richard Mittler, Leichlingen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 14/116,970

(22) PCT Filed: Mar. 14, 2012

(86) PCT No.: PCT/DE2012/000263
§ 371 (c)(1),
(2), (4) Date: Nov. 11, 2013

(87) PCT Pub. No.: WO2012/152240
PCT Pub. Date: Nov. 15, 2012

(65) Prior Publication Data
US 2014/0076265 A1    Mar. 20, 2014

(30) Foreign Application Priority Data

May 10, 2011 (DE) .......................... 10 2011 101 094
Jan. 9, 2012 (DE) .......................... 10 2012 000 241

(51) Int. Cl.
*F16J 1/00* (2006.01)
*F02F 5/00* (2006.01)
*F16J 9/20* (2006.01)

(52) U.S. Cl.
CPC ...... *F02F 5/00* (2013.01); *F16J 9/20* (2013.01)

(58) Field of Classification Search
CPC ................. F16J 9/00; F16J 9/20; F16J 9/206; F02F 5/00

USPC ......................... 123/193.6; 277/434, 438, 460
See application file for complete search history.

(56) References Cited

U.S. PATENT DOCUMENTS

| | | | | |
|---|---|---|---|---|
| 6,131,503 | A | * | 10/2000 | Takashima ....................... 92/172 |
| 6,536,385 | B1 | * | 3/2003 | Takashima ................... 123/73 C |
| 2006/0273525 | A1 | | 12/2006 | Fiedler |
| 2007/0125323 | A1 | | 6/2007 | Hofbauer |

FOREIGN PATENT DOCUMENTS

| | | |
|---|---|---|
| CN | 1932270 | 3/2007 |
| DE | 34 28 007 | 2/1986 |
| DE | 103 40 312 | 5/2005 |
| DE | 10 2006 058 081 | 8/2007 |
| EP | 1 762 756 | 3/2007 |
| FR | 1064856 | 5/1954 |
| GB | 233 401 | 5/1925 |
| JP | 2007-77988 | 3/2007 |

* cited by examiner

*Primary Examiner* — Marguerite McMahon
(74) *Attorney, Agent, or Firm* — Jordan and Hamburg LLP

(57) ABSTRACT

A piston ring system, having an internal diameter >400 mm, for a piston of a two-stroke internal combustion engine, includes at least a first and a second piston ring each having a convex running surface with a crest of the convexity in contact with a cylinder wall and each being inserted into a respective first and second piston ring groove in the piston, wherein the first piston ring faces a combustion chamber and the second piston ring is disposed axially beneath the first piston ring, and wherein the crest of the convexity of the first piston ring is disposed beneath a radial plane passing through a midpoint of axial height of the first piston ring, and the crest of the second piston ring is disposed above a radial plane passing through a midpoint of axial height of the second piston ring.

4 Claims, 5 Drawing Sheets

PISTON RING FOR TWO-STROKE ENGINES

BACKGROUND OF THE INVENTION

As differs from four-stroke engines, two-stroke marine engines have the problem that the supply of oil for lubrication, and thus for reducing wear, must take place by way of oil injection systems. These systems must provide sufficient oil at a suitable time to ensure sufficient lubrication of the cylinder surface/piston rings. A common feature of all known systems is that the oil supply must be carried out under conditions of gas counterpressure. Considering that modern marine engines are operated with rotational speeds of approximately 100 rpm at strokes of up to 2500 mm, the unit of time for the oil distribution is very difficult to establish. In a piston/piston ring system measuring 900 mm in diameter and an oil supply system having approximately 8 intake ports distributed over the circumference, independent oil distribution develops in the circumferential direction by means of the installed components (piston rings) measuring approximately 350 mm, This shows that a conventional piston ring design contributes no more than 3% to the distribution of the oil quantity due to the lack of pressure differentials on the circumference.

Oil supply systems were previously developed that were intended to ensure more rapid oil distribution during supply, despite high counterpressure. Complex piston/piston ring systems to support better oil distribution, which in reality would be difficult to implement, are unknown to date.

U.S. Pat. No. 6,536,385 B1 discloses a piston ring that is provided with geometrically different profiles on the running surface side. This piston ring can be used, in particular, for the oil lubrication of two-stroke engines. Piston rings that are disposed on top of each other and have convex running surfaces are used in a piston/piston ring system, wherein the piston ring is designed to be conical to receive a piston ring groove configured in corresponding fashion, at least in the region of the flank surface of the ring facing a combustion chamber.

DE 10 2006 058 081 A1 discloses a two-stroke internal combustion engine, comprising at least one port of a gas control system of an inlet and/or of an outlet, wherein a gap between a piston and a running surface surrounding the piston is sealed, wherein a combination seal for sealing the gap is provided in the running surface, the piston sliding along this combination seal in such a way that the combination seal has both a gas sealing function and an oil scraping function.

It is the object of the invention to create a piston/piston ring system, in which more uniform oil distribution over the entire running surface of the piston rings, as seen in the circumferential direction, is generated, wherein the absolute oil quantity is also to be reduced.

SUMMARY OF THE INVENTION

Moreover, improved mixing of old and new oil in the system is to be achieved

This object is achieved according to the invention by a piston ring system for a piston of a two-stroke internal combustion engine, having an internal diameter >400 mm, comprising a convex running surface, a crest of the convexity and a supporting region in contact with a cylinder wall, the system being composed of a first piston ring and at least one second piston ring, wherein the first piston ring faces a combustion chamber and the second piston ring is disposed axially beneath the first piston ring, and wherein the crest of the convexity of the first piston ring, measured from the lower flank surface thereof, is disposed beneath the piston ring center, and the crest of the second piston ring, measured from the lower flank surface thereof, is disposed above the piston ring center.

As differs from the known designs, an expedient coordination of the physical conditions optimizes the functionality of the piston/piston ring system, in particular with respect to the oil distribution in the circumferential direction. For this purpose, both the pressure conditions and the operating principles of the individual piston rings with respect to each other are redefined so as to ensure the greatest possible circumferential distribution of the oil with each stroke.

For this purpose, a piston/piston ring system is proposed, which allows the number of piston rings to be reduced to a two-ring, or a three-ring, system, so as to achieve the necessary pressure gradients between the individual rings, and thus in the respective ring groove, which are required for the hydrodynamic conditions on the running surface of the respective piston ring.

An essential part of the invention is the design of the pivot points and the convexities of all the piston rings involved in the system.

A person skilled in the art of piston rings will understand the term "pivot point" as the radially outermost point of convexity (crest), or the maximum point of the running surface profile, or the reversal point of the running surface profile.

The pivot point of the running surface convexity of the first piston ring facing the combustion chamber is set, for this purpose, at approximately ⅓, proceeding from the lower flank surface of the piston ring, and the recesses above and beneath the pivot point are designed so that the pressure gradients in front of and behind the ring have a factor of 85%. The pivot point of the second piston facing the oil chamber is designed opposite to the first piston ring, which is to say, seen from the lower flank surface thereof, the crest is located at approximately ⅔ the height of the overall height of the second piston ring. Due to the proposed shapes of the first and second rings, the oil quantities that are introduced into the ring system will not overflow during the upstroke in the conventional manner from the rings used heretofore, but an oil quantity accumulates, which is transported to the upper dead center due to the convexity according to the invention and appropriately designed pivot points and undergoes circumferential distribution due to the resulting pressure conditions in the intermediate ring volume.

By designing the first ring with a defined convexity and pivot point location approximately in the lower third of the ring running surface, the oil quantity provided during the upstroke will hydrodynamically overflow, and the excess amount will be transported back into the ring system. At the lower reversal point, the oil quantities are again transported back into the ring system for the next stroke, to the extent the oil is not lost through the scavenging ports of the two-stroke engine.

If the piston ring system is to be composed of three piston rings, the third piston ring is positioned axially between the first and second piston rings. According to a further idea of the invention, the running surface of this third piston ring is likewise designed to be convex, wherein the running surface contour of the third piston ring substantially corresponds to that of the second piston ring.

As an alternative, there is the option of designing the running surface of the third piston ring so that the pivot point is located at approximately half the axial height of the piston ring. Due to this design configuration, the piston ring can allow oil to overflow in both stroke directions and can thus contribute to improved oil exchange between old and new oil.

DETAILED DESCRIPTION OF THE INVENTION

Figure 1:
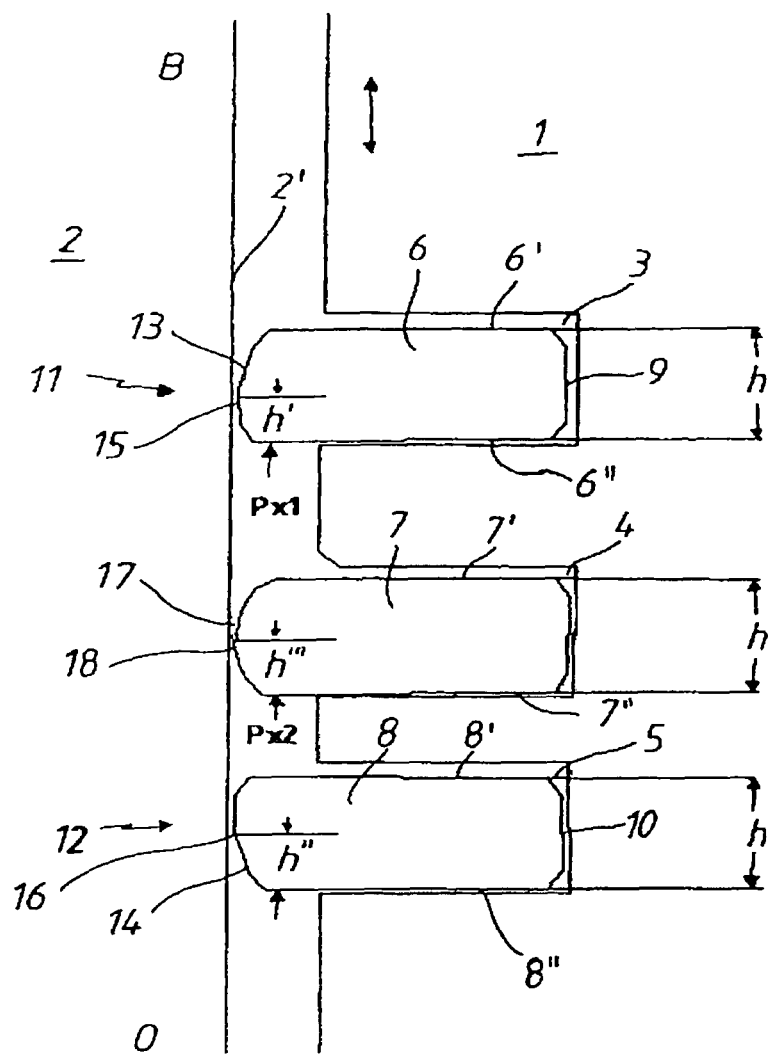
FIG. 1 is a schematic diagram of a piston/piston ring system according to the invention.

FIG. 1 shows a schematic diagram of a piston/piston ring system according to the invention. The simplified illustration shows a piston 1 and a cylinder 2 surrounding the same, which is designed as a cylinder liner if need be. In this example, the piston 1 has several piston ring grooves 3, 4, 5. Piston rings 6, 7, 8 are inserted into the piston ring grooves 3, 4, 5. The piston rings 6 and 8 are essential for the subject matter of the invention. The interposed piston ring 7 is optional, and thus only the piston rings 6 and 8 will initially be considered when looking at the subject matter of the invention.

The piston rings 6, 8 comprise upper flank surfaces 6', 8' and lower flank surfaces 6", 8". Each of the two piston rings 6, 8 has an inner circumferential surface 9, 10 having a diameter >400 mm. The piston/piston ring system according to the invention can he used in a two-stroke internal combustion engine, and preferably in a marine diesel engine. The piston rings 6, 8 have running surfaces 11, 12, respectively, which are operatively connected to a cylinder wall 2' of the surrounding cylinder 2 or of a cylinder liner. The running surfaces 11, 12 are provided with a convex profile 13, 14, The piston ring 6 facing a combustion chamber B is provided with such a convex running surface 13 that a crest 15 (pivot point) is formed, which, relative to the lower flank surface 6" of the piston ring, is located at an axial height h'of approximately ⅓ of the overall axial height h of the piston ring 6. The piston ring 8 facing an oil chamber O is configured differently, in terms of the convex profile 14 thereof, than the piston ring 6. This piston ring 8 also has a crest 16 (pivot point), which, relative to the lower flank surface 8" of the piston ring, is provided axially above the piston ring center, preferably at ⅔ of the total height h of the piston ring 8, The oppositely designed running surface convexities 13, 14 of the piston rings 6 and 8 selected according to the invention cause optimal oil distribution in the circumferential direction, both during the upward movement and during the downward movement of the piston 1.

Depending on the application, it may be useful to provide a further piston ring 7 axially between the piston rings 6 and 8, which likewise has a convex running surface profile 17. This piston ring 7 also has an upper flank surface 7' and a lower flank surface 7". Depending on the application, the crest 18 of the convexity can be provided at approximately half the axial height h''' of the piston ring 7, or axially beneath, or axially above, half the axial height h", in all cases relative to the overall height h.

Figure 2:
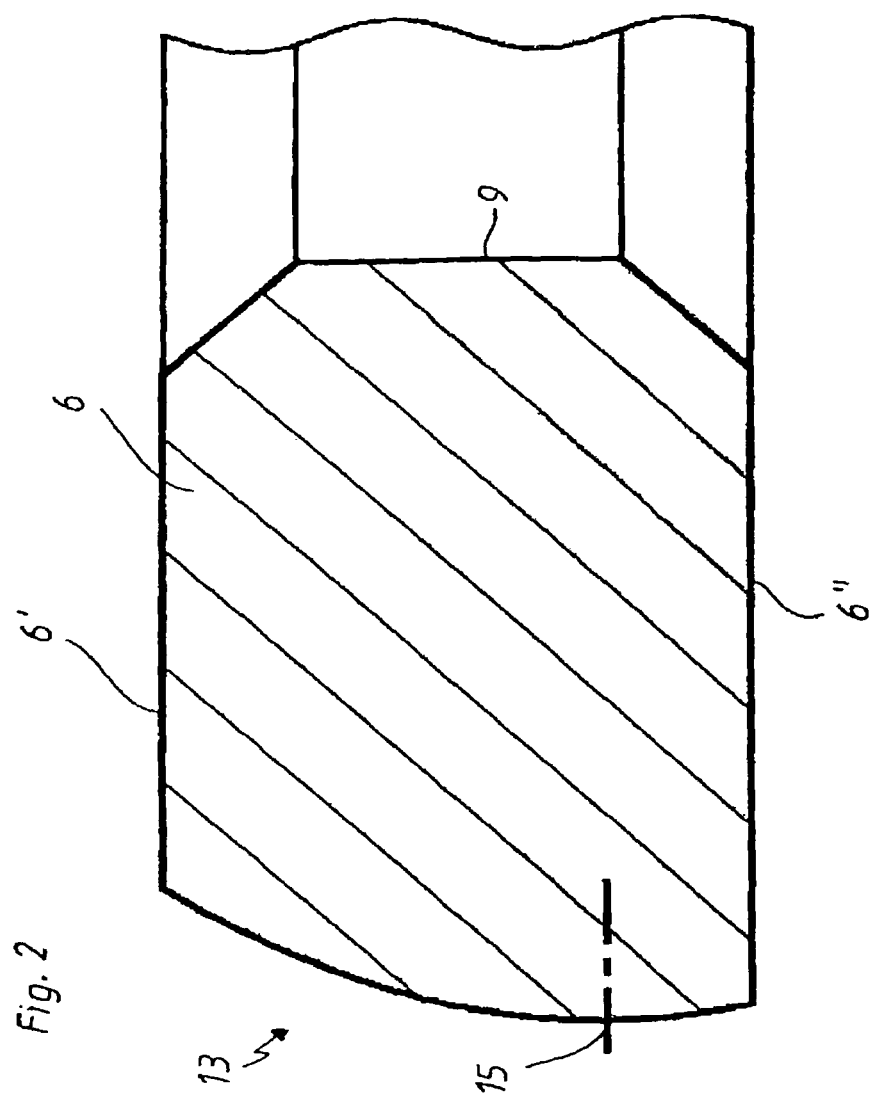
FIG. 2 is a partial view of the piston ring of the system facing the combustion chamber according to FIG. 1.

FIG. 2 shows the piston ring 6 facing the combustion chamber B (FIG. 1), wherein the crest 15 of the convexly shaped running surface 13 is indicated by the dotted line. Also apparent are the inner circumferential surface 9, the upper flank surface 6' and the lower flank surface 6".

Figure 3:
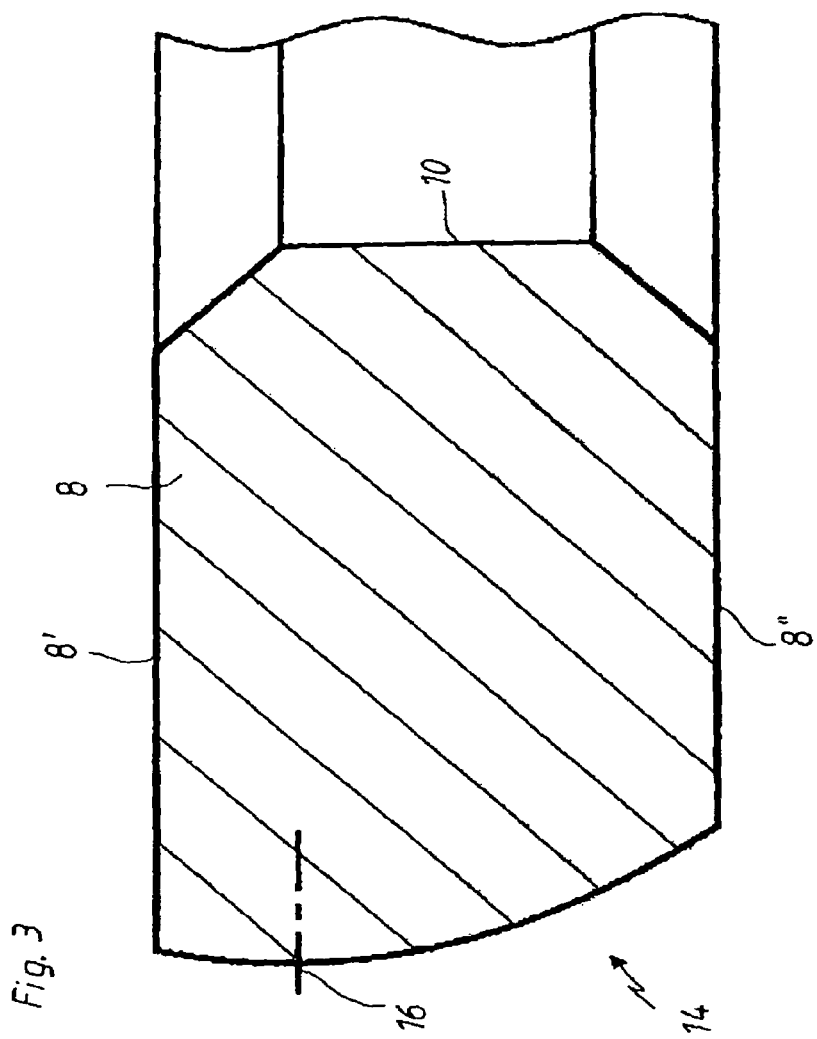
FIG. 3 is a partial view of the piston ring of the system facing the oil chamber according to FIG. 1.

FIG. 3 shows the piston ring 8, wherein the crest 16 of the convexly shaped profile 14 is likewise indicated by the dotted line. Also apparent are the inner circumferential surface 10, the upper flank surface 8' and the lower flank surface 8".

Figure 4:
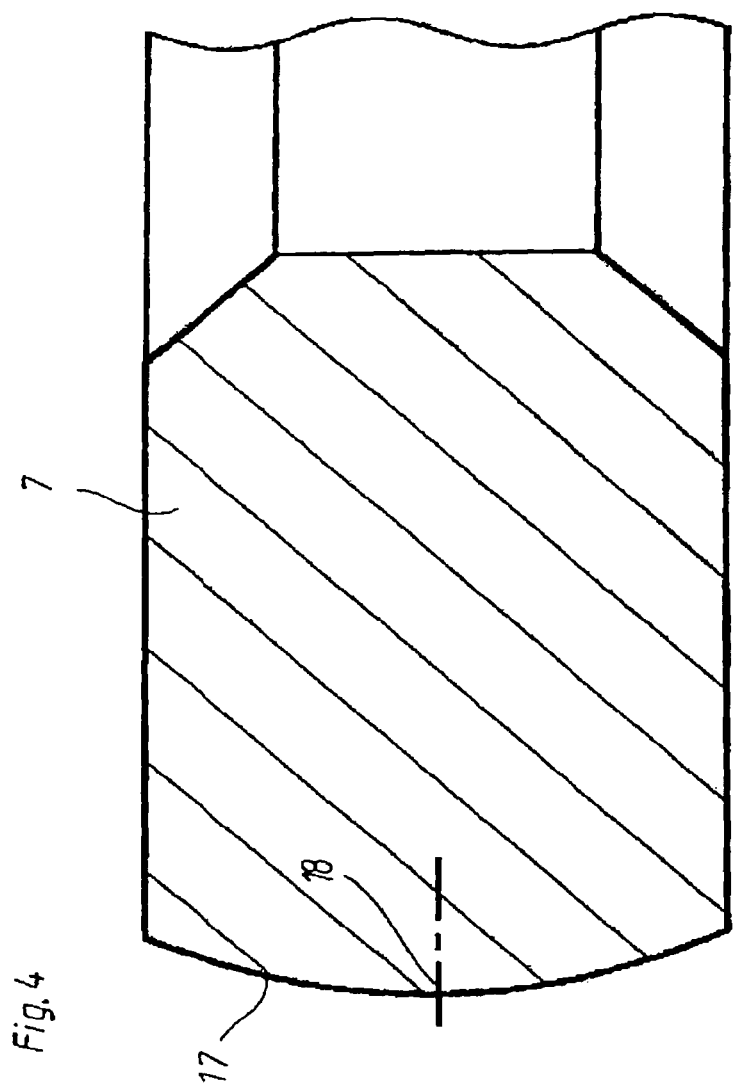
FIG. 4 is a partial view of the center piston ring shown in FIG. 1.

FIG. 4 shows the piston ring 7 which, analogously to FIG. 1, likewise has a convex running surface profile 17, the crest 18 of which in this example is provided at approximately half the axial height of this piston ring 7, Also apparent are the inner circumferential surface, the upper flank surface 7' and the lower flank surface 7".

Figure 5:
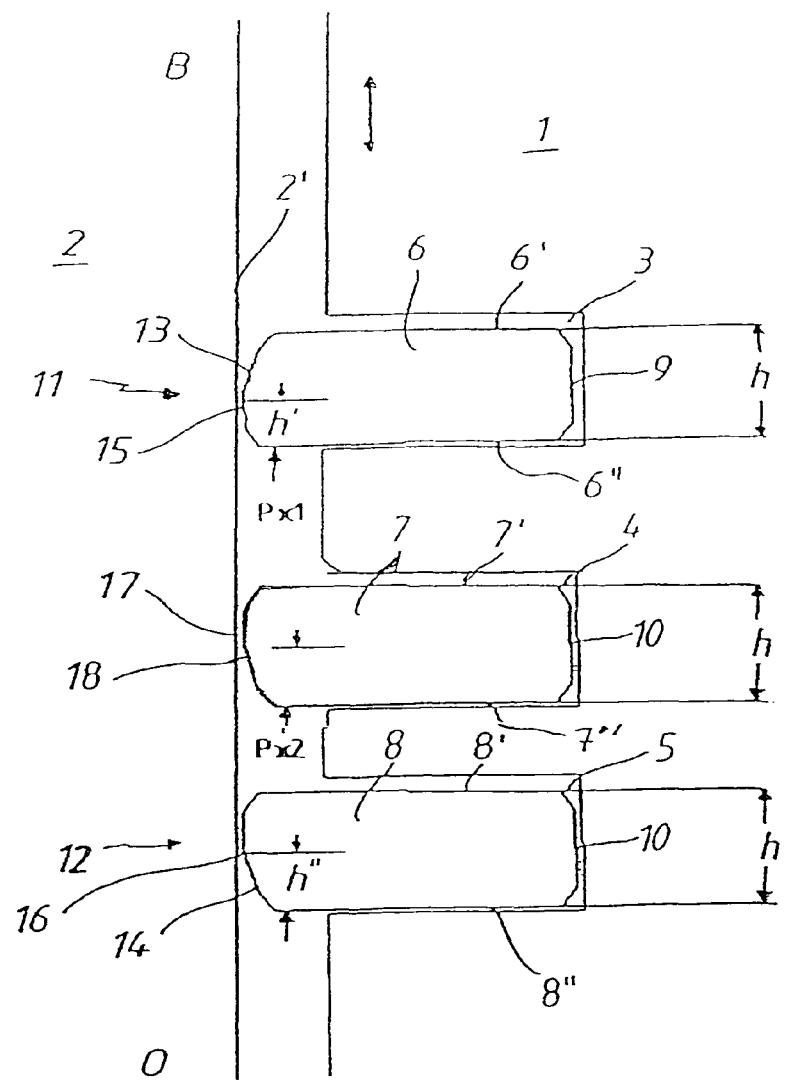
FIG. 5 is a schematic diagram of a piston/piston ring system according to another embodiment of the invention.

FIG. 5 shows a schematic diagram of a piston/piston ring system according to another embodiment of the invention, in which like parts have like reference numbers. Piston ring 7 is positioned axially between the piston rings 6 and 8, and has a convex running surface profile 17'. The piston ring 7 has an upper flank surface 7' and a lower flank surface 7". As shown, piston ring 7 has a running surface contour substantially corresponding to that of the piston ring 8.

The invention claimed is:

1. A piston ring system for a piston movable within a cylinder of a two-stroke internal combustion engine, the cylinder having an internal diameter >400 mm, the piston ring system consisting of three piston rings having a convexity configured to reduce and equalize oil distribution across a circumferential running surface portion of the cylinder spanned by the three piston rings;

wherein the three piston rings include a first piston ring, a second piston ring, and a third piston ring, each one of said first, second and third piston rings having a convex running surface in which a crest of the convex running surface is in contact with an inner wall of said cylinder or of a liner of said cylinder;

wherein said first piston ring is closer to a combustion chamber of said cylinder than said second piston ring and said third piston ring;

wherein said third piston ring is located axially between said first piston ring and said second piston ring;

wherein the crest of the convex running surface of the first piston ring, measured from a lower flank surface thereof, is located at an axial height which is approximately 20 to 40% of the axial height of the first piston ring, so that oil provided during upstroke of the piston hydrodynamically overflows with an excess amount of said oil moving back into the piston ring system to undergo circumferential distribution;

wherein the crest of the second piston ring, measured from a lower flank surface thereof, is located at an axial height which is approximately 60 to 80% of the axial height of the second piston ring, so that at a lower reversal point of a stroke of the piston said oil moves back into the piston ring system to undergo circumferential distribution; and wherein the convex running surface of the third piston ring substantially corresponds to the convex running surface of the second piston ring.

2. The piston ring system according to claim 1, wherein the crest of the first piston ring is located at approximately 30% of the axial height of the first piston ring as measured from the lower flank surface thereof.

3. The piston ring system according to claim 1, wherein the crest of the second piston ring is located at approximately 70% of the second piston ring axial height as measured from the lower flank surface thereof.

4. The piston ring system according to claim 1, further comprising:

a first groove, a second groove, and a third groove in said piston, said first, second, and third groove corresponding respectively to, and respectively receiving, said first, second, and third piston ring.

* * * * *